IRIS CONTROL SYSTEM

Filed April 26, 1967

Inventor
DE LOSS J. TANNER, deceased
by Arthur L. Hellyer, Administrator by Mueller, Aichele & Rauner
Attys.

United States Patent Office 3,496,289
Patented Feb. 17, 1970

3,496,289

IRIS CONTROL SYSTEM

De Loss J. Tanner, deceased, late of Bensenville, Ill., by Arthur L. Heilyer, Wheaton, Ill., assignor to Motorola, Inc., Franklin Park, Ill., a corporation of Illinois Filed Apr. 26, 1967, Ser. No. 635,642
Int. Cl. H04n *5/38;* H01j *29/89*
U.S. Cl. 178—7.2 6 Claims

ABSTRACT OF THE DISCLOSURE

An attachment to a television camera using a vidicon protects the photosensitive target from excessive light when the camera is turned off. When the camera is turned on a voltage is supplied to an automatic iris movement which enables the iris movement to automatically respond in a normal manner to light striking a photoelectric cell in order to control the size of the lens opening. However, when the camera is turned off, no voltage is supplied to the automatic iris movement and the size of the lens opening of the camera is minimum.

BACKGROUND OF THE INVENTION

This invention relates to television cameras and more particularly to a system for protecting the target of a television camera from excessive light through the lens when the camera is turned off.

In using a television camera, particularly a portable one, a wide range of scenery may be televised outside of the studio where controlled lighting conditions do not exist. One problem encountered in televising outside scenes is that of protecting the sensitive target of a television camera containing a photosensitive tube, such as the vidicon, from an excessive amount of light passing through the lens of the camera. Excessive light conditions may be brought about by directing the camera in the direction of the sun or at some scene brightly illuminated by either natural or artificial light. Excessive amounts of light passing through the lens will cause damage to the highly sensitive photoconductive target. The possibility of so damaging the target is particularly acute when the camera is turned off. Even if the amount of light entering the lens when the camera is turned off is insufficient to cause permanent damage to the target, it can still cause image burn-in of the target which will produce undesirable ghosting for a relatively long period when the camera is turned on and put into operation. Non-automatic mechanical protective devices, such as lens covers, are inadequate to give full protection to the target because of the human element of forgetfulness.

SUMMARY

Accordingly, it is an object of this invention to provide a system for protecting the target when the camera is turned off from being either damaged from excessive light from the sun or being subjected to unnecessary image burn-in.

In a particular form of the invention, an iris control system for a televsion camera includes an iris control device for regulating the size of the lens opening of the television camera, and further includes a photoelectric cell for furnishing a first voltage of one polarity to the iris control device to decrease the size of the lens opening with an increase in intensity of ambient light. A protective circuit is further included to supply a fixed second voltage of opposite polarity to the iris control device in order to open the lens opening to a maximum position when no light is entering the photoelectric cell, and to some position less than maximum when light is entering the photoelectric cell. When the camera is turned off, there is no second voltage supplied to the iris control device and the lens opening is at a minimum position to allow minimum light to strike the target.

Figure 1:
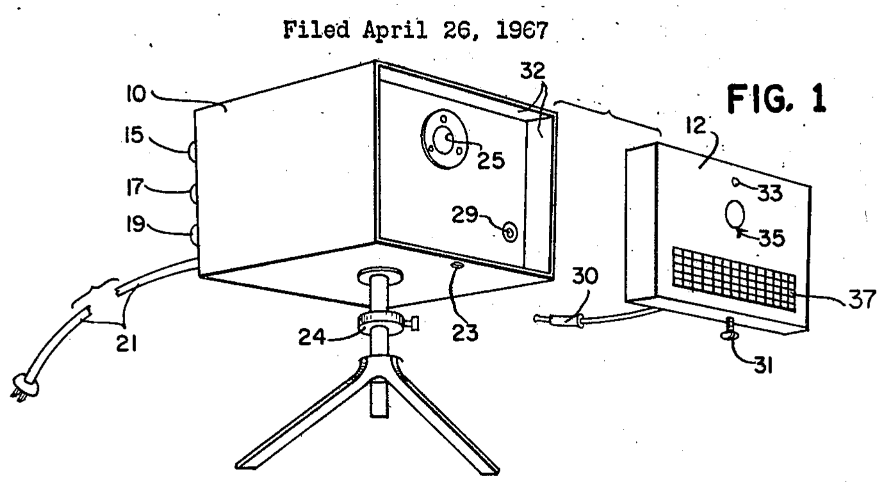
FIG. 1 is a perspective view of the iris control system of this invention and an associated television camera.
Figure 3:
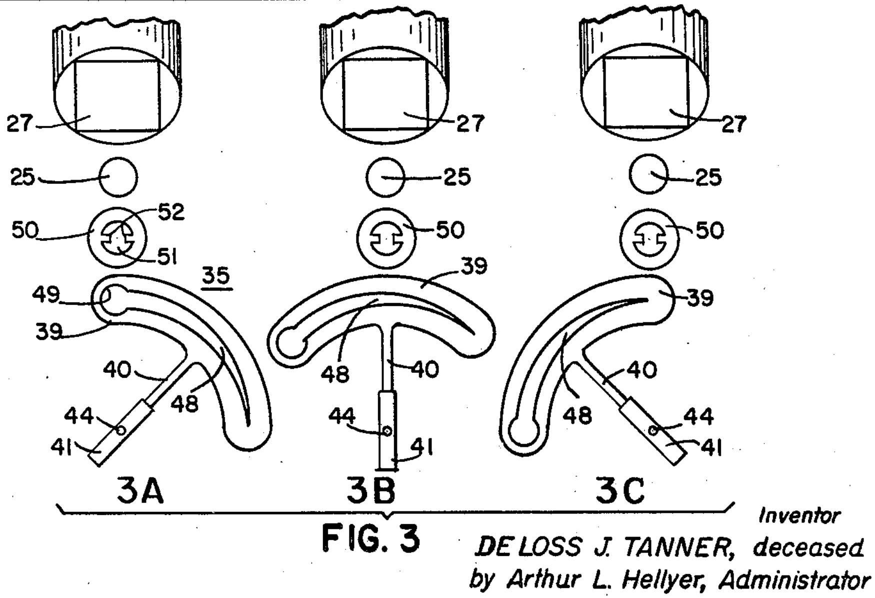
FIG. 3 shows various iris openings under different conditions.

Referring now to FIG. 1, a television camera 10 and the iris control system 12 are depicted. On the rear of the camera 10 are mounted VHF jack 15, VIDEO jack 17 and the ON-OFF switch 19 which controls the application of power to the camera through power cable 21. Located on the underside of the camera are mounting hole 23 and a provision for mounting tripod 24. On the front of the camera is a lens 25 through which light from a scene being viewed is focused onto a photosensitive target 27 (FIG. 3). Also mounted on the front of the camera 10 is ACCESSORY jack or connector 29 which furnishes a —6.3 volt output to iris control system 12 to allow iris control system 12 to operate when it is connected to camera 10 through plug 30. On the bottom of the iris control system 12 is a threaded hole 31. When iris control system 12 is to be used, plug or connector 30 is inserted into ACCESSORY jack 29, the iris control system 12 is seated inside the flanged front edges 32 of camera 10, and a screw is inserted in mounting hole 23 and screwed into threaded hole 31. Also shown in the iris control system 12 is indicator lamp or pilot light assembly 33 which lights when power is applied to the iris control system. Automatc iris vane movement 35 controls the amount of light to lens 25 when the iris control system is being used. A photoelectric cell 37 is mounted on the front of the iris control system and in response to light striking it produces a voltage directly proportional to the intensity of that light.

Figure 2:
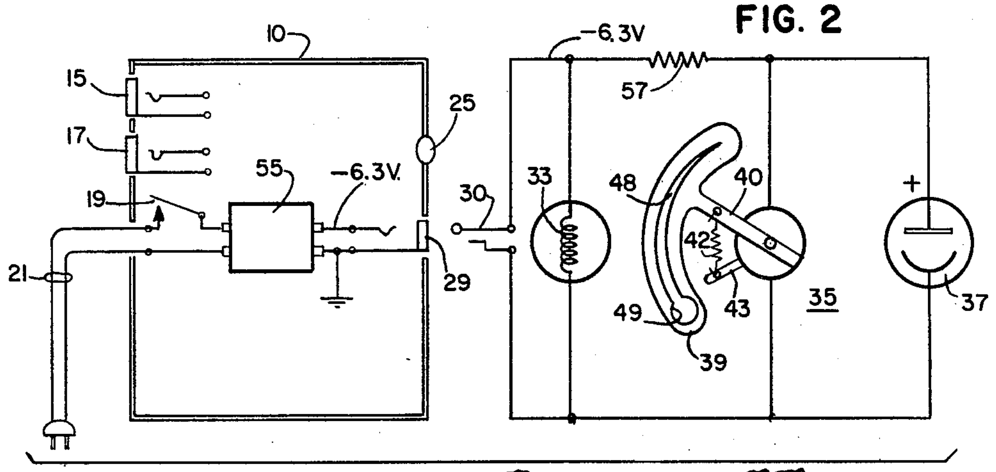
FIG. 2 is a circuit representation of the iris control system of this invention in conjunction with an associated television camera.

A further description of and the operation of the iris control system of FIG. 1 will be explained by reference to FIGS. 2 and 3. Automatic iris movement 35 is a movement such as a D'Arsonval meter movement. An iris vane or arm 39 is attached to the free end of the pointer or radial member 40 which is, in turn, attached to armature 41 (FIG. 3) in the automatic iris movement 35. The armature is rotatable around pivot point 44. Spring 42 (FIG. 2) is anchored at one end to fixed pin 43 on the frame of automatic iris movement 35. The other end of spring 42 is connected to the pointer 40 and is prebiased so that it exerts a counter clockwise force on pointer 40 and hence on armature 41. This force is such that when no current is flowing through automatic iris movement 35, armature 41 is forced into its extreme counterclockwise position. The iris vane 39 has a tapered arcuate slot 48 cut in it with a large hole 49 cut in the wider end of the slot. As shown in FIG. 3, the iris vane 39 is positioned in front of a section 50 having an aperture 51 cut in it. Tabs 52 project into the aperture 51 and are horizontally aligned with each other.

When the iris control system 12 is being used aperture 51 is coaxially aligned with the lens 25 and the only light entering the lens is the light that passes through the aperture 51. The iris vane 39 is rotatably positioned in front of aperture 51 such that it controls the amount of light that passes through the aperture 51 and into the lens 25. The larger the current through automatic iris movement 35, the greater the clockwise deflection of armature 44 and iris vane 39 and the larger the opening in iris vane 39 for light to pass through aperture 51 and into the lens 25. With no current flowing through automatic iris movement 35 the spring tension of spring 42 on pointer 40 maintains iris vane 39 in its maximum counter clockwise position, which is the position of minimum iris vane opening, as shown in FIG. 3(*c*).

When power cable 21 is plugged into a source of power and ON–OFF switch 19 is placed in the ON position, power supply 55, which is located inside television camera 10, is energized. One of the outputs of power supply 55 is a −6.3 v. DC which is connected to ACCESSORY jack 29. When plug 30 is inserted in ACCESSORY jack 29, the −6.3 v. DC is applied across indicator lamp 33 causing the lamp to light, thereby showing that power is being applied to iris control system 12. The −6.3 v. DC is also coupled through resistor 57 to automatic iris movement 35. If there is no light striking the photoelectric cell 37, and hence no voltage output from the cell, there will be a maximum current through automatic iris movement 35 resulting in a maximum clockwise deflection of armature 41 and iris vane 39 to a maximum iris opening for the lens 25. This is shown in FIG. 3(*a*).

On the other hand, when there is light striking the photoelectric cell 37, the cell will produce and couple a positive voltage to the automatic iris movement 35. The amplitude of this positive voltage is directly proportional to the intensity of the ambient light striking the photoelectric cell 37. This positive voltage is connected in series opposition to the negative voltage that is furnished by power supply 55. The absolute difference between these two voltages will appear across automatic iris movement 35 with the result that the more light striking the photoelectric cell, the less the iris vane 39 will be deflected and, therefore, the smaller the iris opening for the lens 25. An example of this is shown in FIG. 3(*b*) for some intermediate value of light striking cell 37.

In the event that the power supply should fail or the camera ON–OFF switch 19 is turned OFF, then the iris vane 39 will be returned to a minimum lens opening position as shown in FIG. 3(*c*). This allows a minimum amount of light through the lens and thereby furnishes the greatest amount of protection to the target 27 when no external voltage is being applied to iris control system 12.

It should be noted at this point that in the application of this invention it is most desirable to have a source of constant current supplying the minimum current required to open the iris fully when there is no light striking the photoelectric cell 37. In practice this is most economically realized by using as high a value of resistance 57 as will supply the aforementioned minimum current from power supply 55.

The invention, therefore, provides a system for protecting the photosensitive target of a turned-off television camera from damage due to excessive sunlight or from image burn-in.

What is claimed is:

1. In a television camera assembly including a switchable power source, a television camera utilizing a vidicon and having a lens which focuses light from a scene before the camera onto the vidicon's light sensitive target which may be damaged by excess light through the lens, an iris control system for the lens of the television camera, including in combination, electrically driven iris control means mounted in line with the target and the lens and responsive to a potential applied thereto to control the amount of light admitted by the lens, light sensitive means coupled to said control means and responsive to the brightness of the scene before the camera to produce a first potential of one polarity to decrease the size of the control means with an increase in scene brightness and thereby decrease the amount of light admitted by the lens, and circuit means coupled to said control means from the switched-on power source to provide a second potential of opposite polarity to change said control means from a minimum opening to a maximum opening with no light on said light sensitive means.

2. The television camera assembly of claim 1 further including detachable coupling means for connecting the iris control system to said television camera so that said television camera can be operated with or without said control system.

3. The television camera assembly of claim 1 further including resistance means connected in series between an output of the switchable power source and said iris control means for determining the amplitude of the second potential in order to establish the desired maximum opening of said control means with no light on said light sensitive means.

4. The television camera assembly of claim 3 wherein the iris control means includes an iris vane movement having an apertured iris vane attached to an armature and positioned adjacent to the lens of the television camera in order to control the amount of light passing through the lens, and further includes an inductance being connected between a reference potential and the junction of said resistance means and said light sensitive means and responsive to the algebraic sum of said first and second potentials to move said iris vane in such a direction across the lens that the amount of light entering the lens is inversely related to changes in ambient lighting conditions.

5. The television camera assembly of claim 1 further including an indicator lamp assembly connected across said circuit means to indicate when said iris control system is connected to the television camera and when the television camera is turned on and has power applied thereto, and wherein said light sensitive means consists of a photoelectric cell which produces said first potential and of an amplitude directly proportional to the intensity of the ambient light striking said cell.

6. In a television camera including a switchable power source mounted therein and a vidicon having a lens which focuses light from a scene before the camera onto a photosensitive target which may be damaged by excess light through the lens, an attachable iris control system, including in combination, electrically driven iris vane means comprising an apertured arm, an armature and an inductance, said arm connected to said armature and positioned in line with the lens and the target in order to control the amount of light striking the target, and said inductance being magnetically coupled to said armature and being responsive to current flow therethrough the cause said armature to move said arm in such a direction across the lens that the amount of light striking the target is inversely responsive to the intensity of the ambient lighting condition, a first connector having first and second terminals mounted on the television camera, said first terminal connected to a reference potential, circuit means coupled from an output of the switchable power supply to said second terminal of said first connector for supplying a first potential of one polarity to said second terminal, a second connector having third and fourth terminals coupled across said inductance so that when said first and second connectors are connected together said first and third terminals are connected together and said second and fourth terminals are connected together and said first potential is coupled to said inductance inducing a current therein and thereby causing said arm to open said movement means, resistance means connected in series between said third terminal and said inductance for controlling the amplitude of said first potential coupled to said inductance and thereby establishing the maximum desired opening of said movement means when a minimum amount of light is passing through the lens, photoelectric cell means coupled across said inductance of said iris vane movement means and responsive to the brightness of the scene before the camera to produce a second potential of opposite polarity from said first potential to decrease the size of said movement means in accordance with the increase of the intensity of the ambient light striking said photoelectric cell means, and a pilot light assembly mounted on said iris control system and connected across said third and fourth terminals to indicate when said iris control system is connected to the television camera and when the television camera is turned on and has power applied thereto.

References Cited

UNITED STATES PATENTS

| | | | |
|---|---|---|---|
| 2,421,476 | 6/1947 | Belar et al. | |
| 3,182,125 | 5/1965 | Kampmeyer | 178—7.2 |

JOHN W. CALDWELL, Primary Examiner

A. H. EDDLEMAN, Assistant Examiner

U.S. Cl. X.R.

178—7.92